(12) United States Patent
Dextreit

(10) Patent No.: US 9,428,175 B2
(45) Date of Patent: Aug. 30, 2016

(54) HYBRID ELECTRIC VEHICLE CONTROLLER AND METHOD OF CONTROLLING A HYBRID ELECTRIC VEHICLE

(75) Inventor: Clement Dextreit, Whitley (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 13/983,230

(22) PCT Filed: Jan. 31, 2012

(86) PCT No.: PCT/EP2012/051488
§ 371 (c)(1),
(2), (4) Date: Oct. 7, 2013

(87) PCT Pub. No.: WO2012/104268
PCT Pub. Date: Aug. 9, 2012

(65) Prior Publication Data
US 2014/0024492 A1 Jan. 23, 2014

(30) Foreign Application Priority Data
Feb. 1, 2011 (GB) .................................. 1101706.8

(51) Int. Cl.
*B60W 10/02* (2006.01)
*B60W 10/04* (2006.01)
(Continued)

(52) U.S. Cl.
CPC .............. *B60W 20/10* (2013.01); *B60W 10/02* (2013.01); *B60W 10/06* (2013.01); *B60W 10/08* (2013.01);
(Continued)

(58) Field of Classification Search
CPC .... B60W 10/02; B60W 10/04; B60W 10/06; B60W 10/08; B60W 10/18; B60W 10/184; B60W 20/10; B60W 20/20; B60W 20/40; B60W 2510/0291; B60W 2510/087; B60W 2510/0676; B60W 6/48; B60W 6/485
USPC ........ 477/3–6, 72, 76, 97, 98, 182, 199, 203, 477/204, 208, 209–210, 171–172; 701/22, 701/51, 54, 65, 67–68
See application file for complete search history.

(56) References Cited

U.S. PATENT DOCUMENTS 5,343,970 A * 9/1994 Severinsky ................ 180/65.25
5,815,824 A 9/1998 Saga et al.
(Continued)

FOREIGN PATENT DOCUMENTS

DE 102007050230 A1 4/2009
DE 102009000706 A1 8/2010
(Continued)

OTHER PUBLICATIONS

International Search Report for PCT Application No. PCT/EP2012/051488 dated Oct. 10, 2012; 6 pages.
(Continued)

*Primary Examiner* — Jacob S Scott
*Assistant Examiner* — Tinh Dang
(74) *Attorney, Agent, or Firm* — Myers Bigel & Sibley, P.A.

(57) ABSTRACT

Embodiments of the invention provide control means for a hybrid electric vehicle, the control means comprising an energy management portion (EMP) configured to determine a required torque split between each of a first and at least a second actuator in dependence on a first set of one or more vehicle parameters, the required torque split being an amount of torque required to be provided to drive the vehicle by each actuator, the control means being configured to provide an actuator request control output whereby each actuator is controlled to provide an amount of torque according to the required torque split, the control means further comprising a powertrain mode manager (PMM) portion, the PMM portion being arranged to override the control output of the EMP in dependence on a value of a second set of one or more vehicle parameters.

16 Claims, 2 Drawing Sheets

(51) Int. Cl.
| | |
|---|---|
| *B60W 10/06* | (2006.01) |
| *B60W 10/08* | (2006.01) |
| *B60W 20/00* | (2016.01) |
| *B60K 6/48* | (2007.10) |
| *B60K 6/485* | (2007.10) |
| *B60W 10/26* | (2006.01) |
| *B60W 10/30* | (2006.01) |

(52) U.S. Cl.
CPC .............. *B60W 10/26* (2013.01); *B60W 10/30* (2013.01); *B60W 20/00* (2013.01); *B60W 2510/0241* (2013.01); *B60W 2510/068* (2013.01); *B60W 2510/0676* (2013.01); *B60W 2510/182* (2013.01); *B60W 2510/246* (2013.01); *B60W 2710/025* (2013.01); *B60W 2710/065* (2013.01); *B60W 2710/0644* (2013.01); *B60W 2710/0666* (2013.01); *B60W 2710/0688* (2013.01); *B60W 2710/0694* (2013.01); *B60W 2710/083* (2013.01); *B60W 2710/182* (2013.01); *B60W 2710/246* (2013.01); *Y02T 10/54* (2013.01); *Y02T 10/6286* (2013.01); *Y10S 903/906* (2013.01); *Y10T 477/23* (2015.01)

(56) References Cited

U.S. PATENT DOCUMENTS

| | | | | |
|---|---|---|---|---|
| 5,842,534 | A * | 12/1998 | Frank .................... | 180/65.25 |
| 6,048,289 | A * | 4/2000 | Hattori et al. ............ | 477/15 |
| 6,336,889 | B1 * | 1/2002 | Oba et al. ................ | 477/5 |
| 6,342,027 | B1 * | 1/2002 | Suzuki .................... | 477/5 |
| 6,396,165 | B1 * | 5/2002 | Nagano .................... | B60K 6/42 |
| | | | | 290/40 R |
| 6,459,980 | B1 * | 10/2002 | Tabata et al. ............. | 701/70 |
| 6,588,256 | B2 * | 7/2003 | Gassner et al. ............ | 73/114.15 |
| 6,655,485 | B1 * | 12/2003 | Ito et al. ................. | 180/65.6 |
| 6,722,230 | B2 * | 4/2004 | Sakamoto et al. .......... | 74/661 |
| 6,740,002 | B1 * | 5/2004 | Stridsberg ................ | 477/14 |
| 7,104,044 | B2 * | 9/2006 | Moore et al. ............. | 60/284 |
| 7,469,177 | B2 * | 12/2008 | Samad et al. ............. | 701/54 |
| 7,766,108 | B2 | 8/2010 | Rimaux et al. | |
| 7,770,678 | B2 * | 8/2010 | Nozaki et al. ............. | 180/65.6 |
| 7,826,961 | B2 * | 11/2010 | Jinno .................... | B60H 1/04 |
| | | | | 123/179.4 |
| 8,249,768 | B2 * | 8/2012 | Mori et al. ............... | 701/22 |
| 8,277,363 | B2 * | 10/2012 | Lahti et al. .............. | 477/98 |
| 8,380,416 | B2 * | 2/2013 | Offerle et al. ............ | 701/83 |
| 8,527,178 | B2 * | 9/2013 | Noguchi et al. ........... | 701/99 |
| 2002/0019294 | A1 * | 2/2002 | Yamazaki et al. .......... | 477/169 |
| 2002/0029624 | A1 | 3/2002 | Gassner et al. | |
| 2003/0004032 | A1 * | 1/2003 | Tamor .................... | 477/5 |
| 2004/0006414 | A1 | 1/2004 | Suzuki | |
| 2005/0256629 | A1 | 11/2005 | Tao et al. | |
| 2006/0293841 | A1 * | 12/2006 | Hrovat et al. ............. | 701/205 |
| 2007/0246554 | A1 | 10/2007 | Watanabe et al. | |
| 2008/0129049 | A1 * | 6/2008 | Sauvlet et al. ............ | 290/34 |
| 2008/0132379 | A1 * | 6/2008 | Matsubara et al. .......... | 477/3 |
| 2008/0173485 | A1 * | 7/2008 | Kumazaki ................ | B60K 6/365 |
| | | | | 180/65.28 |
| 2008/0220937 | A1 * | 9/2008 | Nozaki et al. ............. | 477/86 |
| 2009/0156355 | A1 * | 6/2009 | Oh et al. ................. | 477/5 |
| 2009/0233766 | A1 * | 9/2009 | Kadota ................... | 477/176 |
| 2009/0234524 | A1 * | 9/2009 | Kim ...................... | 701/22 |
| 2010/0042281 | A1 * | 2/2010 | Filla ..................... | B60Q 5/00 |
| | | | | 701/22 |
| 2010/0063662 | A1 | 3/2010 | Harada et al. | |
| 2010/0070123 | A1 * | 3/2010 | Itoh et al. ............... | 701/22 |
| 2011/0287889 | A1 | 11/2011 | Eisele et al. | |
| 2011/0288701 | A1 * | 11/2011 | Chen .................... | 701/22 |
| 2012/0072064 | A1 * | 3/2012 | Kumazaki et al. ......... | 701/22 |

FOREIGN PATENT DOCUMENTS

| | | |
|---|---|---|
| EP | 0916547 A2 | 5/1999 |
| EP | 0922600 A2 | 6/1999 |
| EP | 1925521 A2 | 5/2008 |
| EP | 1975028 A2 | 10/2008 |
| EP | 2141056 A1 | 1/2010 |
| FR | 2882698 A1 | 9/2006 |
| JP | H07-033066 | 2/1995 |
| JP | 2005-278281 A | 10/2005 |
| JP | 2005-319910 A | 11/2005 |
| JP | 2008-265682 A | 4/2007 |
| JP | 2010-058746 A | 3/2010 |

OTHER PUBLICATIONS

International Search Report dated Jul. 5, 2012, International Application No. PCT/EP2011/074043; 5 pages.
International Search Report for PCT Application No. PCT/EP2012/051485 dated Jul. 2, 2012; 4 pages.
International Search Report for PCT Application No. PCT/EP2012/051486 dated Jul. 4, 2012; 3 pages.
International Search Report for PCT Application No. PCT/EP2012/051487 dated Jul. 10, 2012; 4 pages.
Written Opinion for PCT Application No. PCT/EP2011/074043 mailed Jun. 23, 2013; 6 pages.
Hancock, Matthew; "Hybrid Electric Vehicle Controller and Method of Controlling a Hybrid Electric Vehicle"; U.S. Appl. No. 13/983,235, filed Aug. 1, 2013; 28 pages.
Hancock et al., Matthew; "Hybrid Electric Vehicle and Method of Controlling a Hybrid Electric Vehicle"; U.S. Appl. No. 13/983,238, filed Aug. 1, 2013; 19 pages.
Hancock et al., Matthew; "Hybrid Electric Vehicle Controller and Method of Controlling a Hybrid Electric Vehicle"; U.S. Appl. No. 13/983,239, filed Aug. 1, 2013; 36 pages.
Laing, Philippa; "Hybrid Electric Vehicle Controller and Method of Controlling a Hybrid Electric Vehicle"; U.S. Appl. No. 13/997,528, filed Jun. 24, 2013; 19 pages.

* cited by examiner

US 9,428,175 B2

HYBRID ELECTRIC VEHICLE CONTROLLER AND METHOD OF CONTROLLING A HYBRID ELECTRIC VEHICLE

CROSS REFERENCE TO RELATED APPLICATIONS

This application is a National Phase Application of Patent Application PCT/EP2012/051488 filed on 31 Jan. 2012, which claims priority to GB1101706.8, filed 1 Feb. 2011, of which both applications are incorporated by reference herein in their entirety.

FIELD OF THE INVENTION

The present invention relates to a controller for a hybrid electric vehicle and to a method of controlling a hybrid electric vehicle (HEV).

BACKGROUND

It is known to provide a hybrid electric vehicle (HEV) having an electric machine and an internal combustion engine (ICE) connected in parallel to a driveline of the vehicle.

The vehicle may be operated in an electric vehicle (EV) mode in which torque to the driveline is provided exclusively by the electric machine. Alternatively the vehicle may be operated in a parallel mode in which torque is provided to the driveline by the ICE and electric machine.

STATEMENT OF THE INVENTION

Embodiments of the invention may be understood by reference to the appended claims.

Aspects of the invention provide control means, a vehicle and a method as claimed in the appended claims.

In another aspect of the invention for which protection is sought there is provided control means for a hybrid electric vehicle,
the control means comprising an energy management portion (EMP) configured to determine a required torque split between each of a first and at least a second actuator in dependence on a first set of one or more vehicle parameters, the required torque split being an amount of torque required to be provided to drive the vehicle by each actuator, the control means being configured to provide an actuator request control output whereby each actuator is controlled to provide an amount of torque according to the required torque split,
the control means further comprising a powertrain mode manager (PMM) portion, the PMM portion being arranged to override the control output of the EMP in dependence on a value of a second set of one or more vehicle parameters.

Embodiments of the invention have the advantage that if the control output of the EMP is such that a particular condition is met in respect of the second set of one or more vehicle parameters, the controller can override the control output of the EMP. In some embodiments this has the advantage that excessive wear of the vehicle or damage to the vehicle may be prevented. In some embodiments an amount of carbon dioxide or other undesirable gas produced by the vehicle may be reduced, and/or an amount of fuel consumed by the vehicle may be reduced.

It is to be understood that reference to an energy management portion (EMP) and a powertrain mode manager (PMM) portion includes reference to embodiments in which the EMP and PMM are implemented in physically separate portions of the control means or in a single portion, for example in software code executed on a single computing device.

The control means may be in the form of a controller comprising computing means, such as a microprocessor-based computer. The controller may comprise a single computing device or a plurality of computing devices, such as a plurality of device modules. The EMP portion of the control means and the PMM portion may be implemented in respective software codes running on a single computing device. Alternatively the respective codes may be run on different respective computing devices.

Software code implementing the EMP portion may be configured to determine a required torque split and whether one or more of the actuators should be switched on or off, according to an energy management protocol. The energy management protocol may be arranged to balance a requirement for a reasonable level of vehicle performance and drivability against a requirement for reduced exhaust gas emissions and/or increased fuel economy and determine a relative torque split between the respective actuators. That is, determine the relative amounts of torque that are to be provided by the respective actuators to drive the vehicle. In a vehicle having an internal combustion engine, the EMP portion may determine whether the engine should be on or off at a given moment in time.

Embodiments of the invention have the advantage that software code of the EMP portion that is configured to determine the required torque split according to the first set of one or more vehicle parameters and whether one or more actuators should be on or off at a given moment in time is not required to take into account the second set of one or more vehicle parameters when making its determination. Thus, for example if the PMM portion determines that the first actuator is unavailable due to a fault condition, and the EMP portion determines that the vehicle should operate in a parallel recharge mode requiring running of the first actuator and delivery of a prescribed amount of torque by the first actuator, the PMM portion may override the control output of the EMP portion that is requiring the first actuator to be restarted.

In some arrangements the PMM portion may then provide a control output causing the second actuator to provide the required driver demanded torque. This control output may be in the form of a command to a controller of the second actuator causing that controller to monitor driver torque demand and control the second actuator accordingly. Alternatively the PMM portion may monitor driver torque demand and command directly the second actuator to provide an amount of torque that the PMM portion determines should be provided (this might typically correspond to driver demanded torque). The PMM portion may also command that notification is provided to the driver that the first actuator is inoperable.

In an embodiment the PMM is arranged to override the required torque split output of the EMP responsive to the value of said one or more vehicle parameters thereby to maintain the value of said one or more vehicle parameters within a prescribed range.

In an embodiment the PMM is arranged to override the required torque split output of the EMP responsive to a control signal from a vehicle cabin temperature controller, the PMM being arranged to provide a control signal to start the first actuator thereby to generate heat to heat a cabin.

This has the advantage that the controller can control the vehicle in such a manner that values of one or more vehicle parameters do not stray outside of a permitted range.

It is to be understood that the PMM may control the first actuator to start but not to be connected to the driveline unless the EMP commands the first actuator to deliver torque to the driveline. In some embodiments if the PMM commands starting of the first actuator but does not command connection of the first actuator to the driveline, the PMM may place the first actuator under the control of a speed control means in order to control the first actuator speed to correspond to that of the second actuator. It is to be understood that if the first actuator (such as an engine) is started automatically but the speed of rotation does not vary with vehicle speed the driver may become concerned and consider that a fault has occurred. By controlling the speed of the first actuator to correspond to that of the second actuator or vehicle speed, a risk that a driver perceives incorrect vehicle operation may be reduced.

In an embodiment the PMM is responsive to a temperature of an aftertreatment apparatus arranged to process exhaust gas generated by the first actuator.

This feature may be particularly useful when the first actuator is a gasoline fuelled internal combustion engine. Embodiments of the invention allows the temperature of the aftertreatment apparatus to be maintained at a temperature at which it is able sufficiently to treat exhaust gases passing therethrough. If this is performed when the engine is not delivering drive torque, the amount of undesirable emissions may be reduced. In some embodiments the engine may be started and warmed before connection to the driveline, i.e. before the flow rate of exhaust gases through the aftertreatment apparatus increases substantially as an increase in torque $TQ_e$ demanded from the engine occurs.

In an embodiment the PMM is arranged to maintain the temperature of the aftertreatment apparatus above a prescribed first aftertreatment apparatus temperature threshold by controlling the first actuator to start in the event an aftertreatment apparatus temperature falls below the first aftertreatment apparatus temperature threshold whilst the first actuator is stopped.

Optionally the PMM is arranged to maintain a temperature of the aftertreatment apparatus above the prescribed first aftertreatment apparatus temperature threshold by overriding a command by the EMP to shut down the first actuator when the aftertreatment apparatus temperature is below a second prescribed aftertreatment device apparatus temperature threshold, wherein the first temperature threshold is lower than the second temperature threshold.

This feature has the advantage of reducing a risk of mode chattering, i.e. repeated stopping and starting of the engine in rapid succession to maintain the temperature above a given threshold value.

In an embodiment the PMM is arranged to maintain the coolant temperature above a prescribed first coolant temperature threshold by controlling the internal combustion engine to start in the event the coolant temperature falls below the first coolant temperature threshold and the engine is off and inhibiting an engine off command from the EMP when the coolant temperature is below a second prescribed coolant temperature threshold.

This has the advantage that in some embodiments an amount of mechanical wear of the engine due to restarting when 'cold' may be reduced. Furthermore in some embodiments an amount of undesirable combustion gases generated by the engine due to operation of the engine at reduced temperatures may be reduced.

In an embodiment the first prescribed coolant temperature threshold is lower than the second prescribed coolant temperature threshold.

In an embodiment the PMM is responsive to a temperature of a power storage device operable to provide power to the second actuator, wherein when a temperature of the power storage device is below a prescribed value the PMM is arranged to command at least one of: charging of the power storage device; drawing of charge from the power storage device; and alternately to charge the power storage device and draw charge from the power storage device thereby to warm the power storage device. The power storage device may be an electrical power storage device and the second actuator may be an electric machine.

In an embodiment the PMM is arranged to override the control output of the EMP responsive to a speed difference between a torque input portion and a torque output portion of a releasable torque transmitting means for coupling the first actuator to a driveline of the vehicle, when the speed difference exceeds a prescribed value the control means being arranged to control rotation of the first actuator to reduce the speed difference to a value below the prescribed value, Thus, if the first actuator (such as an engine) is off and the speed difference exceeds a prescribed value the PMM is arranged to start the first actuator and to control the speed of rotation so as to ensure the speed difference does not exceed the prescribed value.

In an embodiment the control means is operable to control a releasable torque transmitting means in the form of a clutch means to connect the first actuator in the form of an engine to the driveline of the vehicle when the speed difference exceeds the prescribed value.

In an embodiment, when the first actuator is not operating the PMM is arranged to start the first actuator thereby to power a brake pump when a state of a brake system status flag indicates a brake pressure is below a prescribed threshold.

Thus, in the case that the brake pump is arranged to compress fluid to power the one or more brakes, when the brake pressure is below a required brake pressure (such as hydraulic fluid pressure) the pump is restarted to restore the brake pressure. Likewise, if the brake pump is arranged to generate a vacuum thereby to power the one or more brakes, when the brake vacuum pressure is below a required brake vacuum pressure the pump is restarted to restore the vacuum pressure.

In an embodiment when the first actuator is not operating the control means is configured to monitor actuation of brakes of the vehicle, the control means being operable to command starting of the first actuator responsive to at least one selected from amongst a number of times a brake pedal is depressed by a driver, a number of times the driver applies pressure to the brake pedal above a prescribed value, and a function responsive to an integral of the brake pedal pressure applied by the driver as a function of time.

This feature has the advantage that the vehicle is arranged to start the engine to power the brake pump regardless of the state of the brake system status flag if one or more prescribed conditions in respect of brake operation occur indicating that the brake pressure may have fallen below the prescribed threshold. Thus if the brake system status flag fails to be set correctly when the pressure falls below the prescribed threshold the vehicle is arranged automatically to restart the engine regardless of the status of the flag if the one or more prescribed conditions are met.

For example, the vehicle may be arranged to start the engine when the driver applies pressure to the brake pedal exceeding a prescribed value three times.

In an embodiment the EMP is operable to provide a control output to command starting and stopping of the first actuator, the PMM being operable to override a command from the control means to start or stop the first actuator.

In an embodiment the PMM is operable to override the control output of the EMP thereby to command an alternative torque split between the first and second actuators.

In one aspect of the invention there is provided a hybrid electric vehicle comprising control means according to the preceding aspect. The first actuator is advantageously an internal combustion engine such as a petrol engine, diesel engine or mixed fuel engine. The second actuator is advantageously an electric machine.

In an aspect of the invention for which protection is sought there is provided a method of controlling by control means a hybrid electric vehicle, the method comprising determining a required torque split between each of a first and at least a second actuator in dependence on a first set of one or more vehicle parameters by means of an energy management portion (EMP) of the control means, the required torque split being an amount of torque required to be provided to drive a vehicle by each actuator, and providing an actuator request control output to control each actuator to provide an amount of torque according to the required torque split, the method further comprising overriding by means of a powertrain mode manager (PMM) portion the required torque split output of the EMP in dependence on a value of a second set of one or more vehicle parameters.

In another aspect of the invention for which protection is sought there is provided control means for controlling a parallel-type hybrid electric vehicle, the control means being operable to control first and second actuators to deliver motive torque to drive a vehicle, wherein in a first control mode the control means controls first and second actuators to drive a vehicle and in a second control mode the control means controls a second actuator to drive a vehicle and controls a first actuator not to drive a vehicle, when in the second control mode the control means being operable to control a speed of rotation of a first actuator to vary in a manner corresponding to a speed of rotation of a second actuator whilst the first actuator is not driving a vehicle.

This feature may have a number of advantages associated therewith. One advantage may be that when it is required to drive a vehicle by means of a first actuator, a first actuator may be connected to a driveline of a vehicle more quickly since a speed of rotation of a first actuator already corresponds to that of a second actuator. It is to be understood that a speed of a first actuator and a speed of a second actuator may not be the same. However if a speed of a second actuator decreases, a speed of a first actuator decreases in a corresponding manner and if a speed of a second actuator increases a speed of a first actuator increases in a corresponding manner. In the event that first and second actuators are coupled to a common drive input, such as a transmission input shaft, a time required in order to match speeds of first and second actuators may be decreased in some situations.

A further advantage may be that in the case where a first actuator is separated from a driveline by clutch means or the like, a differential speed of rotation between input and output portions of the clutch means may be reduced.

A still further advantage is that when the first actuator is running a user may expect a sound generated by the first actuator to vary in a manner corresponding to a speed of the second actuator, which may in turn vary in a manner corresponding to vehicle speed. By controlling a speed of a first actuator to vary in a manner corresponding to that of a second actuator a user perception of correct operation of a first actuator may be enhanced.

If in contrast a speed (and associated noise) of a first actuator did not vary with vehicle speed following initial starting of a first actuator a user may wonder whether a fault has occurred. Only when a first actuator was connected to a driveline of a vehicle would a driver observe the expected correspondence between speeds of first and second actuators.

In one aspect of the invention for which protection is sought there is provided a method of controlling a parallel-type hybrid electric vehicle, the method comprising controlling by control means first and second actuators to deliver motive torque to drive the vehicle, whereby in a first control mode the control means controls first and second actuators to drive the vehicle and in a second control mode the control means controls the second actuator to drive the vehicle and controls the first actuator not to drive the vehicle, whereby when in the second control mode control the method comprises controlling the speed of rotation of the first actuator to vary in a manner corresponding to the speed of rotation of the second actuator whilst the first actuator is not driving a vehicle.

The first actuator may be controlled to vary in a manner corresponding to that of the second actuator so that the speeds are substantially the same as one another. The speed of the first actuator may be controlled by a first actuator speed controller. The first actuator speed controller may be separate from the control means.

The first actuator may be an internal combustion engine such as a diesel, petrol or mixed fuel engine. The second actuator may be an electric machine.

In an aspect of the invention for which protection is sought there is provided a hybrid electric vehicle having: a first and at least a second actuator each operable to deliver torque to a driveline, the first actuator comprising an internal combustion engine, the second actuator comprising an electric machine; releasable torque transmitting means operable releasably to couple the first actuator to the driveline, the releasable torque transmitting means being operable between a first condition in which the first actuator is substantially disconnected from the driveline and a second condition in which the first actuator is substantially connected to the driveline; control means operable to control the vehicle to transition between a first mode in which the releasable torque transmitting means is in the first condition and a second mode in which the releasable torque transmitting means is in the second condition, the control means comprising an energy management portion (EMP) configured to determine a required torque split between each of the first and at least a second actuator, the required torque split being an amount of torque required to be provided to the driveline by each actuator according to an energy management protocol, the controller being configured to provide an actuator request control output whereby each actuator is controlled to provide the amount of torque required according to the energy management protocol, the control means further comprising a powertrain mode manager (PMM)

portion, the PMM portion being arranged to override the control output of the EMP responsive to the value of the one or more vehicle parameters.

In an embodiment the PMM is arranged to override the control output of the EMP responsive to the value of one or more vehicle parameters thereby to maintain the value of the one or more vehicle parameters within a prescribed range.

The PMM may be arranged to override the control output of the EMP responsive to a control signal from a vehicle cabin temperature controller, the PMM being arranged to provide a control signal to start the first actuator thereby to generate heat to heat the cabin according to the control signal from the vehicle cabin temperature controller.

It is to be understood that the control signal may be in the form of a flag or any other suitable signal.

In an embodiment the PMM is responsive to the temperature of an engine aftertreatment apparatus arranged to process exhaust gas generated by the engine.

The PMM may be arranged to maintain the temperature of the aftertreatment apparatus above a prescribed first aftertreatment device temperature threshold by controlling the internal combustion engine to start in the event the aftertreatment device temperature falls below the first aftertreatment device temperature threshold and the engine is off.

In an embodiment in the event that the engine is started by the PMM when the vehicle is in the first mode responsive to the temperature of the aftertreatment device the PMM is arranged to maintain the vehicle in the first mode of operation unless a transition to the second mode is required.

The PMM may be arranged to maintain the temperature of the aftertreatment apparatus above the prescribed first aftertreatment device temperature threshold by inhibiting an engine off command from the EMP when the aftertreatment device temperature is below a second prescribed aftertreatment device temperature threshold.

This feature has the advantage that an amount of combustion gas released to the atmosphere that has passed through the aftertreatment device with the device at a temperature below the first prescribed temperature may be reduced.

Optionally the first prescribed aftertreatment device temperature threshold is substantially the same as the second prescribed aftertreatment device temperature threshold.

In an embodiment the first prescribed aftertreatment device temperature threshold is lower than the second prescribed aftertreatment device temperature threshold.

The PMM may be arranged to maintain a coolant temperature of the first actuator above a prescribed coolant temperature threshold.

In an embodiment the PMM is arranged to maintain the coolant temperature above a prescribed first coolant temperature threshold by controlling the internal combustion engine to start in the event the coolant temperature falls below the first coolant temperature threshold and the engine is off and inhibiting an engine off command from the EMP when the coolant temperature is below a second prescribed coolant temperature threshold.

The first prescribed coolant temperature threshold may be substantially the same as the second prescribed coolant temperature threshold.

Advantageously the first prescribed coolant temperature threshold is lower than the second prescribed coolant temperature threshold.

The introduction of a difference between the values of coolant temperature for starting of the engine and inhibiting stopping of the engine has the advantage that a risk of mode chattering in which the vehicle repeatedly switches on and off the first actuator may be reduced.

The PMM may be responsive to the temperature of a power storage device operable to provide power to the electric machine.

Optionally when the temperature of the power storage device is below a prescribed value the PMM is arranged to control the vehicle so as to perform at least one of: charging of the power storage device and drawing charge from the power storage device thereby to warm the storage device.

In an embodiment, when the temperature of the power storage device is below the prescribed value the PMM is arranged to control the vehicle so as to alternately charge the power storage device and draw charge from the power storage device by means of one or more of the actuators.

The PMM may be arranged to override a control output of the EMP responsive to a speed difference between a torque input portion and a torque output portion of the releasable torque transmitting means, when the speed difference exceeds a prescribed value the controller being arranged to control rotation of the first actuator to reduce the speed difference to a value below the prescribed value.

The PMM may be arranged to control the releasable torque transmitting means to assume the second condition when the speed difference exceeds the prescribed value.

The releasable torque transmitting means may comprise clutch means.

In an embodiment, the first actuator is operable to drive a brake pump arranged to pump fluid thereby to provide power to actuate one or more brakes of the vehicle, one of said one or more vehicle parameters being a state of a brake system status flag, the state of the brake system status flag being responsive to a brake fluid pressure.

The brake pump may be a vacuum pump arranged to pump gas to establish a vacuum in the brake system (for vehicles having such a brake system), or a pressure pump arranged to compress gas or hydraulic fluid in the form of a liquid to pressurise fluid in the brake system (for vehicles having such a brake system).

When the vehicle is in the first mode the PMM may be arranged to start the first actuator thereby to power the brake pump when the state of the brake system status flag indicates the brake pressure is below a prescribed threshold.

Thus, in the case that the brake pump is arranged to compress fluid to power the one or more brakes, when the brake pressure is below a required brake pressure (such as hydraulic fluid pressure) the pump is restarted to restore the brake pressure. Likewise, if the brake pump is arranged to generate a vacuum thereby to power the one or more brakes, when the brake vacuum pressure is below a required brake vacuum pressure the pump is restarted to restore the vacuum pressure.

In an embodiment, when the vehicle is in the first mode and the first actuator is off the vehicle is arranged to monitor actuation of the brakes of the vehicle during the period in which the first actuator is off, the vehicle being arranged to control the vehicle to start the engine responsive to at least one selected from amongst the number of times a brake pedal is depressed by a driver, the number of times the driver applies a pressure to the brake pedal above a prescribed value, and a function responsive to an integral of the brake pedal pressure applied by the driver as a function of time.

This feature has the advantage that the vehicle is arranged to start the engine to power the brake pump regardless of the state of the brake system status flag if one or more prescribed conditions in respect of brake operation occur indicating that the brake pressure may have fallen below the prescribed threshold. Thus if the brake system status flag fails to be set correctly when the pressure falls below the prescribed threshold the vehicle is arranged automatically to restart the engine regardless of the status of the flag.

For example, the vehicle may be arranged to start the engine when the driver applies pressure to the brake pedal exceeding a prescribed value three times.

In a further aspect of the invention there is provided a method of controlling a hybrid electric vehicle having a first and at least a second actuator each operable to deliver torque to a driveline of the vehicle, the first actuator comprising an internal combustion engine, the second actuator comprising an electric machine; the method comprising determining by means of an energy management portion (EMP) of a controller a required torque split between each of the first and at least a second actuator being an amount of torque required to be provided to the driveline by each actuator according to an energy management protocol; controlling each actuator to provide the amount of torque required according to the energy management protocol; and overriding by means of the PMM portion the control output of the EMP responsive to the value of one or more vehicle parameters.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
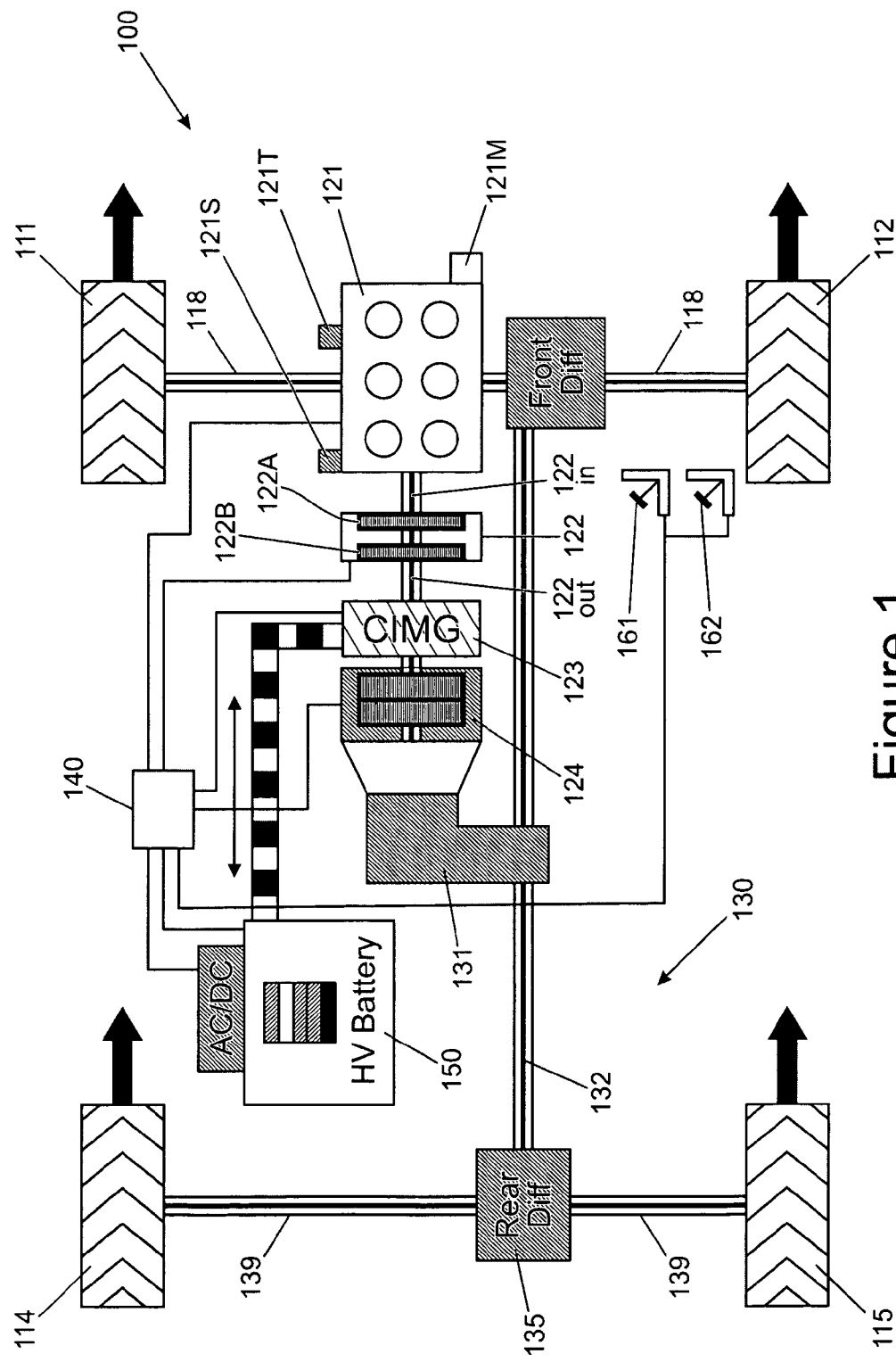
FIG. 1 is a schematic illustration of a hybrid electric vehicle according to an embodiment of the invention.

FIG. 1 shows a hybrid electric vehicle (HEV) 100 according to an embodiment of the present invention. The HEV 100 has one actuator in the form of an internal combustion engine 121 releasably coupled by means of a clutch 122 to a second actuator in the form of a crankshaft integrated motor/generator (CIMG) 123. The clutch 122 has an input shaft 122IN coupled to a crankshaft of the engine and arranged to rotate therewith. The clutch 122 also has an output shaft 122OUT coupled to the CIMG 123 and arranged to rotate therewith.

The clutch 122 has a pair of plates 122A, 122B that are fixedly coupled to the input shaft 122IN and output shaft 122OUT respectively.

The clutch 122 is operable to transition between an open condition and a closed condition. In the open condition the plates 122A, 122B are separated from one another such that substantially no torque is transferred from the input shaft 122IN to the output shaft 122OUT. In the closed condition the plates 122A, 122B are urged together such that torque applied to the input shaft 122IN by the engine 121 is transferred substantially directly to the output shaft 122OUT.

The clutch 122 is operable to move the plates 122A, 122B towards one another as the clutch 122 transitions from the open condition to the closed condition whereby the amount of torque transferred from the input shaft 122IN to the output shaft 122OUT may be increased in a controlled manner.

Similarly, the clutch 122 is operable to move the plates 122A, 122B away from one another as the clutch transitions from the closed condition to the open condition.

The CIMG 123 is in turn coupled to an automatic transmission 124. In the embodiment of FIG. 1 the clutch 122 is a wet multi-plate clutch pack 122 rather than (say) a torque converter and is mounted within a housing of the automatic transmission 124 as is the CIMG 123 although other arrangements are also useful. In some embodiments the clutch 122 may be provided in a separate housing external to the housing of the automatic transmission 124.

The transmission 124 is arranged to drive a pair of front wheels 111, 112 of the vehicle 100 by means of a pair of front drive shafts 118. The transmission 124 is also arranged to drive a pair of rear wheels 114, 115 by means of an auxiliary driveline 130 having an auxiliary driveshaft 132, a rear differential 135 and a pair of rear driveshafts 139.

It is to be understood that other arrangements are also useful. For example the transmission 124 may be arranged permanently to drive the rear wheels 114, 115 and to drive the front wheels 111, 112 in addition to the rear wheels when required.

A battery 150 is provided that may be coupled electrically to the CIMG 123 in order to power the CIMG 123 when it is operated as a motor. Alternatively the battery 150 may be coupled to the CIMG 123 to receive charge when the CIMG 123 is operated as a generator, thereby to recharge the battery 150.

The vehicle 100 is configured to operate in either one of a parallel mode and an electric vehicle (EV) mode.

In the parallel mode of operation the clutch 122 is closed and the engine 121 is arranged to provide drive torque to the transmission 124. In this mode the CIMG 123 may be operated either as a motor or as a generator.

In the EV mode of operation the clutch 122 is open and the engine 121 is turned off. Again, the CIMG 123 is then operated either as a motor or as a generator. It is to be understood that the CIMG 123 may be arranged to act as a generator in EV mode in order to effect regenerative braking of the vehicle.

The vehicle 100 has a controller 140 operable to control the vehicle 100 to transition between the parallel and EV modes when required.

In the present embodiment when a transition from EV mode to parallel mode is required the controller 140 is configured to start the engine 121 by means of a starter motor 121M and to control the engine speed $W_e$ to match substantially the speed of the output shaft 122OUT of the clutch 122 before closing the clutch 122. In the embodiment of FIG. 1 the speed of the output shaft 122OUT corresponds to that of the CIMG 123, $W_c$. The controller 140 controls $W_e$ by reference to an output of an engine speed sensor 121S that provides a signal corresponding to the actual engine speed $W_e(t)$ at a given time t.

Figure 2:
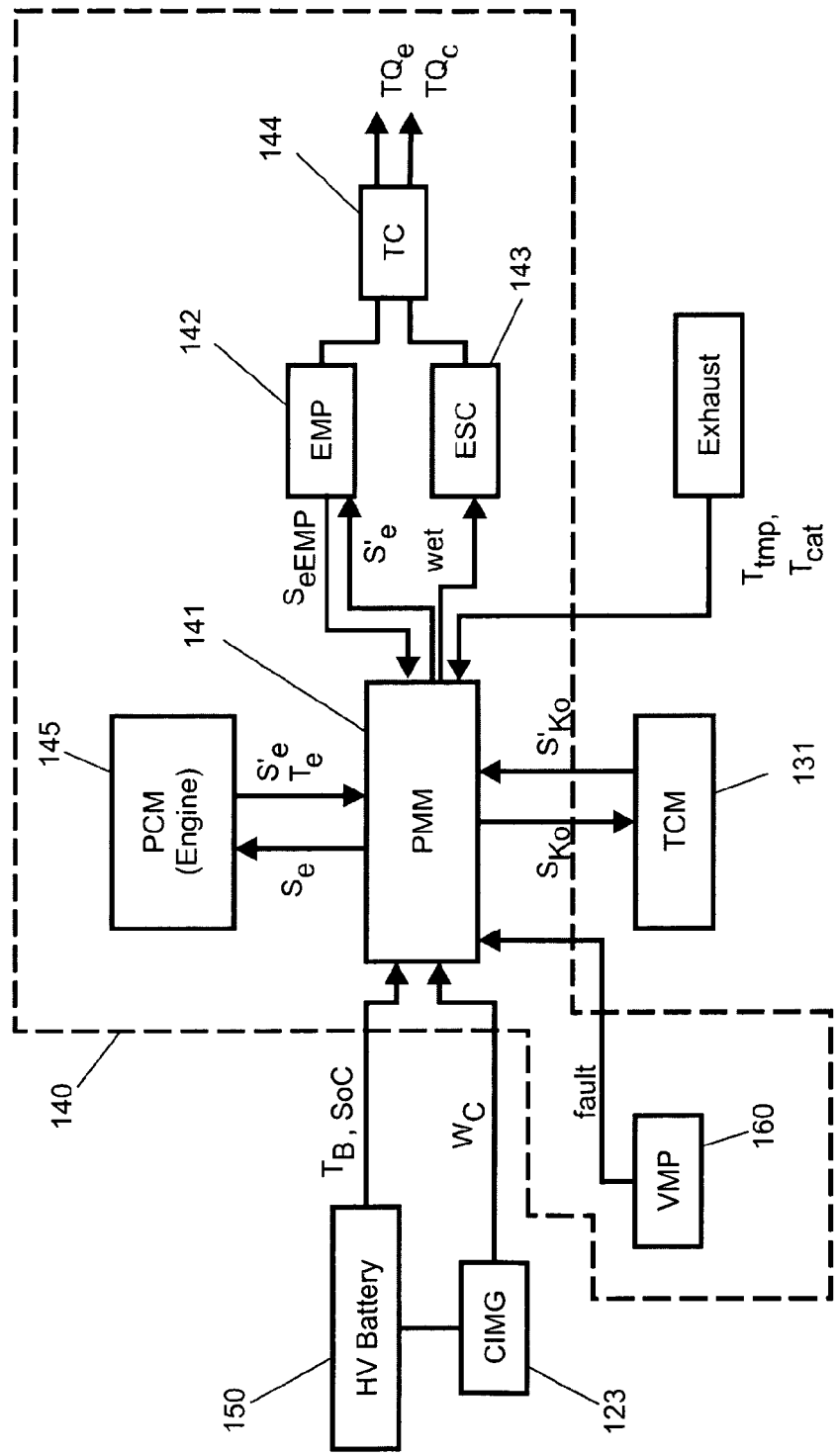
FIG. 2 is a schematic illustration of a controller for a hybrid electric vehicle according to an embodiment of the invention.

FIG. 2 is a schematic illustration showing a configuration of the controller 140. The controller 140 is a computing device configured to execute software code. The code is arranged to implement six control functions as follows: a powertrain mode manager (PMM) function 141, an engine speed control (ESC) function 143, an energy management protocol (EMP) function 142, a torque control (TC) function 144, a powertrain control function 145 (also referred to as a powertrain control module function (PCM) 145) and a vehicle mode process (VMP) function 160. In some embodiments one or more of these functions are executed in software code on one or more separate computing devices, for example in a separate control module.

The EMP function 142 is configured to provide control signals to the engine 121 and CIMG 123 in respect of the amount of torque it is required for the engine 121 and CIMG 123, respectively, to develop at a given moment in time. Thus, the EMP function 142 determines a required torque split between the engine 121 and CIMG 123 being the amounts of torque it is required to be provided by each of these actuators in order to provide the required value of driver demanded torque $TQ_d$.

The EMP function 142 is arranged to provide a control signal to the TC function 144 in respect of the values of torque required from the engine 121 and CIMG 123 respectively. The TC function 144 provides corresponding torque request output signals $TQ_e$, $TQ_c$ to the engine 121 and CIMG 123 respectively. It is to be understood that the TC function 144 may vary the amount of torque requested of the engine 121 and CIMG 123 from that communicated to the TC function 144 by the EMP function. For example, during a gear change or when required by a dynamic stability control (DSC) function the amount of torque requested may be momentarily decreased.

If the EMP function 142 determines that the engine 121 should be switched off, the EMP function 142 provides a control signal $S_{eEMP}$ to the PMM function 141 which communicates in turn with the PCM function 145 to switch off the engine 121.

A value $S_{eEMP}=0$ indicates that the EMP function 142 has determined that the engine 121 should be maintained in an off condition whilst a value $S_{eEmp}=1$ indicates that the EMP function 142 has determined that the engine 121 should be maintained in an on condition The PMM function 141 is arranged to provide a control signal $S_e$ to the PCM function 145 corresponding to the required state of the engine 121. A value $S_e=0$ indicates that it is required to maintain the engine in an off condition whilst a value $S_e=1$ indicates that it is required to maintain the engine in an on condition.

The PCM function 145 is arranged in turn to provide a return signal $S'_e$ to the PMM function 141 indicative of the actual state of the engine 121. A return signal $S'_e=0$ from the PCM function 145 indicates the engine is off whilst a return signal $S'_e=1$ indicates that the engine is on. The PMM function 141 is arranged to inform the EMP function 142 of the actual state $S_e'$ of the engine 121 according to the PCM function 145. In some embodiments, in addition to or instead of providing a value of $S_e'$ to the EMP function 142 the PMM function 141 provides a value of $S_e'$ to the EMP function 142.

The PCM function 145 also provides a signal $T_e$ to the PMM function 141 indicative of a temperature of the engine 121. In some embodiments $T_e$ corresponds to the temperature of a coolant of the engine 121.

The ESC function 143 is arranged to generate engine torque request signals to the TC function 144 responsive to a request from the PMM 141 to control the engine 121 to achieve a required target speed of rotation $W_{eT}$. Thus, the PMM 141 is operable to place the engine 121 under the control of the ESC function 143 when required in order to achieve and/or maintain a required target speed $W_{eT}$.

It is to be understood that the engine 121 may be placed under the control of the ESC function 143 when the engine 121 is started and it is required to achieve a particular value of engine speed $W_e$ before closure of the clutch 122.

When it is required to close the clutch 122 the PMM function 141 is arranged to provide a control signal $S_{K0}$ to a transmission control module (TCM) 131. The TCM 131 is configured to control actuators associated with the clutch 122 to close or open the clutch 122 responsive to signal $S_{K0}$. If $S_{K0}=0$ the clutch 122 is placed in the open condition whilst if $S_{K0}=1$ the clutch 122 is placed in the closed condition.

The TCM 131 is also configured to provide an output signal $S'_{K0}$ to the PMM function 141 corresponding to the actual state of the clutch 122, i.e. whether the clutch 122 is open ($S_{K0}=0$) or closed ($S_{K0}=1$).

It is to be understood that in some embodiments the PMM 145 is arranged to set a flag corresponding to a state of the engine 121 (whether on or off), the state of the clutch 122 (open or closed) as input by the TCM 131 and of the battery 150 (e.g. temperature). The flag may be arranged to be set to the value of a state vector, being a vector having a value responsive to the state of the engine 121, the clutch 122 and the battery 150 such that the EMP 142 is able to determine the state of the engine 121, clutch 122 and battery 150 by reference to a single state variable. This has the advantage that the number of control signals may be reduced.

In the event that the vehicle is operating in EV mode and it is required to transition to the parallel mode, the PMM function 141 is configured to provide a control signal $S_e=1$ to the engine 121 to start the engine 121. Once the engine 121 has been started by the PCM function 145 the PMM function 141 places the engine 121 under the control of the ESC function 143. The PMM function 141 provides the ESC function 143 with the required value of $W_{eT}$ and the ESC function 143 controls the engine 121 such that engine speed $W_e$ becomes substantially equal to $W_{eT}$.

It is to be understood that because the PMM function 141 places the engine 121 under the control of the ESC function 143 the amount of NVH (noise, vibration and harshness) experienced by the driver when the clutch 122 is closed may be reduced. This is because if the input and output shafts 122IN, 122OUT of the clutch 122 are rotating at substantially the same speed when the clutch 122 is closed, the amount of NVH developed as the clutch 122 closes will typically be less than in the case that the shafts 122IN, 122OUT are rotating at different speeds. However other benefits may also be enjoyed such as reduced time required for the transition from the EV mode to the parallel mode.

As noted above the ESC function 143 may be employed to control the engine 121 to achieve $W_{eT}$ before closing the clutch 122. In some embodiments $W_{eT}$ is set to a value that is substantially equal to $W_c$. In some alternative embodiments $W_{eT}$ is set to a value that is greater than $W_c$. In the event that $W_{eT}$ is set to a value that is greater than $W_c$ the PMM 141 may be arranged to set $S_{K0}=1$ when $W_e$ reaches (or exceeds) $W_c$ as $W_e$ increases towards $W_{eT}$.

It is to be understood that in the event that the PMM function 141 determines that one or more prescribed conditions exists in respect of one or more vehicle parameters, the PMM function 141 may be arranged to over-ride one or more control signals of the EMP function 142, such as a control signal to transition between the EV and parallel modes or to remain in one of the modes.

Maximum CIMG Speed $W_c$ in EV Mode

For example, in the event that CIMG speed $W_c$ exceeds a prescribed maximum value $W_{cmax}$ and the vehicle is in EV mode (i.e. the clutch 122 is open) the PMM function 141 may be arranged to control the vehicle to transition to the parallel mode even when the EMP function 142 requires that the vehicle remain in the EV mode. This is because the clutch 122 is configured such that there is a maximum allowable speed difference between the input and output shafts 122IN, 122OUT of the clutch 122. It is to be understood that in some embodiments this is because damage may occur to the clutch 122 if the speed difference between the input and output shafts 122IN, 122OUT exceeds a prescribed value. The transition from EV to parallel mode reduces a speed difference to substantially zero thereby reducing a risk of damage to the clutch 122.

It is to be understood that the PMM function 141 may provide a control signal to the EMP function 142 indicating that a transition from EV to parallel mode is required and that such transition is about to take place (or is taking place).

In some embodiments the engine 121 may be spun up to reduce a speed difference between the engine 121 and CIMG 123 but the clutch 122 may remain open.

Battery State of Charge (SoC)

In the event that the battery SoC falls below a prescribed value and the vehicle 100 is in EV mode the EMP function 142 is arranged to trigger a transition of the vehicle 100 from the EV mode to the parallel mode. This is in order to allow the battery SoC to be increased thereby to prevent damage to the battery due to excessive discharge.

Engine Temperature $T_e$

In some embodiments the PMM 141 is arranged to ensure that $T_e$ remains at or above a prescribed temperature at all times during vehicle operation. In some embodiments this is to enable a cabin temperature of the vehicle 100 to be kept at a comfortable temperature. In addition or instead $T_e$ may be kept at or above the prescribed value in order to reduce an amount of wear of the engine 121 when the engine 121 is restarted and/or reduce emission of undesirable gases.

Thus, in the event that $T_e$ falls below a prescribed value and the engine 121 is off, the PMM function 141 may be configured to provide a control signal $S_e=1$ to the PCM function 145 to start the engine 121.

In some preferred embodiments the PMM function 141 also controls the vehicle 100 to transition to the parallel mode of operation if $T_e$ falls below the prescribed value.

If $T_e$ is below the prescribed value when the engine 121 is on, the PMM function 141 is arranged to inhibit the EV mode. In other words, the PMM function 141 is arranged to override a control signal from the EMP function 142 to switch off the engine 121 (such as a signal to transition from parallel mode to EV mode). It follows that if $T_e$ is above the prescribed value when the engine 121 is on the PMM function 141 is arranged not to override a control signal from the EMP function 142 to switch off the engine 121.

In some embodiments the PMM function 141 is arranged to override control signals of the EMP 142 by providing a corresponding inhibit signal to the EMP 142. Thus in the event that the PMM function 141 determines that the vehicle 100 should assume a different mode to the currently selected mode (such as the parallel mode when the vehicle 100 is in EV mode) the PMM function 141 may be arranged to provide an 'EV inhibit' or like signal to the EMP function 142 which would in turn control the vehicle to assume the parallel mode.

It is to be understood that the prescribed value of $T_e$ below which the PMM function 141 starts the engine 121 may be the same as the prescribed value of $T_e$ above which the PMM function 141 no longer inhibits stopping of the engine 121.

Alternatively, in some embodiments hysteresis is introduced in respect of the prescribed value of $T_e$ in order to reduce a risk of mode chattering in which the PCM function 145 receives commands to switch the engine 121 on and off repeatedly in rapid succession.

Thus, the prescribed value of $T_e$ below which the PMM function 141 switches on the engine 121 may be arranged to be lower than the prescribed value of $T_e$ above which the PMM function 141 no longer inhibits stopping of the engine 121.

In one embodiment, if it is determined that a driver requires use of a vehicle heating, ventilation and air conditioning (HVAC) system in order to heat the cabin, a HVAC controller (not shown) provides a corresponding control signal to the PMM function 141. If $T_e$ is below a prescribed value the PMM function 141 may be arranged to start the engine 121 and inhibit stopping of the engine 121 until $T_e$ rises above a prescribed value. In some embodiments the PMM function 141 is arranged not to inhibit the EMP 142 from controlling the vehicle 100 to operate in the EV mode when the HVAC system is required to be used, whilst in some embodiments the PMM function 141 may provide a signal to the EMP function 142 to inhibit operation in EV mode in such circumstances. Again, hysteresis may be introduced in respect of the value of $T_e$ below which the engine 121 is started and the value of $T_e$ above which stopping of the engine 121 is not inhibited as described above.

In some embodiments the PMM function 141 may be arranged to monitor a temperature of the battery 150. In the event the temperature of the battery 150 falls below a prescribed value the PMM function 141 may be arranged to inhibit EV mode and to start the engine 121 in order to warm the battery 150 by means of a battery heating circuit. It is to be understood that the battery heating circuit may be a fluid or like conduit through which engine coolant is caused to flow in order to heat the battery 150. Alternatively or in addition the battery heating circuit may comprise an electrical heating element operable to heat the circuit by means of electrical current.

In addition or instead the PMM function 141 may be arranged to cause the vehicle 100 to be controlled alternately to draw charge from the battery 150 and to recharge the battery 150 in order to warm the battery 150.

It is to be understood that in some embodiments the PMM function 141 is arranged to start the engine 121 or inhibit stopping of the engine 121 responsive to an ambient temperature $T_a$ independently of or in combination with the engine temperature $T_e$.

Brake Vacuum Level

The PMM function 141 may also be responsive to a pressure of a braking system of the vehicle.

In some embodiments the vehicle 100 is provided with an engine driven vacuum pump and an electrical vacuum pump. In the event that a brake vacuum pressure level deteriorates to a value above a prescribed value and the vehicle is in EV mode (i.e. the engine 121 is in the off condition), the PMM function 141 may be arranged to control the vehicle 100 to start the engine 121. This has the effect that the engine driven vacuum pump is started in order to restore the brake vacuum level to a value at or below a prescribed threshold pressure level.

It is to be understood that in some embodiments the engine 121 is started in order to drive the engine driven vacuum pump if an electrical vacuum pump of the vehicle 100 is incapable of restoring a brake vacuum level sufficiently quickly when the vacuum level becomes degraded.

It is to be understood that the vehicle 100 may be arranged to set a state vector according to the brake vacuum pressure. When the brake vacuum pressure reaches a prescribed value the state vector is set to a value indicating the vacuum pressure has reached a level that is unacceptable, requiring the vacuum pump to be restarted.

The PMM function 141 may be responsive to the value of the state vector, the PMM function 141 being configured to start the engine 121 when the state vector indicates that the brake vacuum pressure has deteriorated sufficiently.

In some embodiments the PMM function 141 is arranged to control the vehicle 100 to transition from the EV mode to the parallel mode when the vacuum pressure deteriorates to a value that is unacceptably close to atmospheric pressure.

In some alternative embodiments, the PMM function 141 is arranged to start the engine 121 to restore the brake vacuum pressure when the state vector indicates the brake vacuum pressure has deteriorated sufficiently, but does not trigger a transition from EV mode to parallel mode. That is, the PMM function 141 does not provide a signal to the EMP 142 to trigger a transition to the parallel mode, such as an 'EV inhibit' signal or the like. This has the advantage that interruption of the EMP 142 is not required. This has the advantage in some embodiments that an amount of fuel consumed by the vehicle 100 and/or an amount of carbon dioxide emitted by the vehicle 100 may be reduced.

In some embodiments the PMM function 141 is arranged to monitor actuation of a brake pedal 162 of the vehicle 100. If the driver applies a pressure to the brake pedal 162 exceeding a prescribed value more than (say) three times and the state vector does not indicate that the vacuum pump should be restarted the PMM function 141 is configured automatically to start the engine 121.

In some embodiments the PMM function 141 is also arranged to set the value of the state vector to a value indicating that the vacuum pump should be started. In some embodiments the state vector is set to a value indicating that the state vector is in an error state. When the state vector is in such a state the engine 121 may be switched on permanently when the vehicle is in an active mode.

It is to be understood that in some embodiments the driver is required to apply a pressured to the brake pedal 162 exceeding the prescribed value more than or less than three times before the engine 121 is started automatically regardless of the state of the brake vacuum state vector.

Engine Aftertreatment System

In some embodiments the PMM function 141 is configured to receive input signals corresponding to a temperature of one or more components of an engine aftertreatment apparatus or system. In the embodiment of FIG. 2 the PMM function 141 is configured to receive input signals corresponding to the temperature $T_{trap}$ of a gas trap and the temperature $T_{cat}$ of a catalytic converter.

The gas trap is arranged to trap certain gaseous species contained in engine exhaust gases when the engine is first started. This is to allow time for the catalytic converter to warm up to a temperature that is within a prescribed operating range where the catalytic converter it is able to perform a required aftertreatment of the exhaust gases.

In other words the gas trap traps certain exhaust gases (or a certain amount of one or more exhaust gases) whilst $T_{cat}$ increases to a value within a prescribed range.

Once the temperature of the gas trap $T_{trap}$ exceeds a first prescribed value $T_{trap-1}$ (corresponding to a temperature at which $T_{cat}$ is within the prescribed range), gases trapped in the gas trap are released for treatment by the catalytic converter which is positioned downstream of the gas trap. As noted above, it is to be understood that $T_{trap-1}$ is arranged to be a temperature at which $T_{cat}$ is high enough to allow the required aftertreatment of the exhaust gases.

Furthermore, as the engine 121 continues to run and $T_{trap}$ increases still further, it is found that the gas trap will be substantially empty when $T_{trap}$ reaches a second prescribed value $T_{trap-2}$.

It is to be understood that the PMM function 141 may be configured to prevent shutdown of the engine unless $T_{trap}$ is greater than or equal to $T_{trap-2}$. This is so that when the engine 121 is next restarted, the gas trap will be substantially empty.

Furthermore, the PMM function 141 may also be configured to start the engine 121 if $T_{cat}$ falls below a prescribed minimum value. This is to reduce a risk that combustion gases from the engine 121 will be released to the environment without being treated sufficiently. The PMM function 141 may also be configured to prevent shutdown of the engine 121 if $T_{cat}$ is below a prescribed value.

Again, hysteresis may be introduced in respect of the value of $T_{cat}$ below which the PMM function 141 instructs the PCM function 145 to start the engine 121 and the temperature above which shutdown of the engine 121 is not inhibited by the PMM function 141 if the EMP function 142 requests that the engine 121 is stopped. Thus the value of $T_{cat}$ below which the PMM function 141 commands an engine start may be lower than the value of $T_{cat}$ above which the PMM function 141 does not inhibit engine stop.

In some embodiments when engine 121 is started the PMM function 141 is configured to maintain the clutch 122 in the open condition after starting the engine 121 before allowing the clutch 122 to close. This is so as to allow the catalytic converter to warm up in a relatively low flow rate of exhaust gases before increasing the flow rate when the clutch closes and a higher torque demand $TQ_e$ is placed on the engine. This has the advantage that the amount of exhaust gas that flows though the catalytic converter before the catalytic converter reaches a prescribed temperature of operation may be reduced. This has the advantage of reducing an amount of combustion gases released to the environment before the catalytic converter reaches a temperature at which it is capable of performing a required treatment of exhaust gases passing therethrough.

In some embodiments the PMM function 141 is configured to allow a prescribed period of time to elapse before allowing the clutch 122 to close. In addition or instead in some embodiments the PMM function is configured to wait until the catalytic converter has warmed to a prescribed temperature before closing the clutch 122.

It is to be understood that in some embodiments the engine aftertreatment system comprises a catalytic converter and not a gas trap.

In some embodiments in which the engine aftertreatment system comprises a catalytic converter and a gas trap the PMM function 141 may be responsive to a temperature of either the catalytic converter or the gas trap.

Other arrangements are also useful.

Battery Temperature $T_B$

In the embodiment of FIG. 2 the VMP function 160 is arranged to receive a signal $T_B$ indicative of a temperature of the battery 150. In the event that the vehicle is operating in the parallel mode and the $T_B$ exceeds a prescribed value the VMP function 160 provides a control signal to the PMM function 141 responsive to which the PMM function 141 may prevent a transition from the parallel mode to EV mode. This has the effect that a risk of a further rise in temperature of the battery 150 due to a relatively high expected current drain in EV mode may be reduced.

Similarly, if the vehicle is in EV mode and $T_B$ exceeds the prescribed value the VMP function 160 may provide a control signal to the PMM function 141 responsive to which a transition to the parallel mode may be made.

It is to be understood that in parallel mode, an amount of current drawn from the battery 150 is expected to be less than that in EV mode since in parallel mode a portion of $TQ_d$ is provided by the engine 121.

It is to be understood that other arrangements are also useful.

For example, in some embodiments the VMP function 160 may be arranged to provide a control signal to the PMM function 141 responsive to which the PMM function 141 is arranged to prevent the CIMG 123 acting as a generator when $T_B$ exceeds the prescribed value. This is so as to reduce an amount of current flow into the battery 150 to reduce a risk of a further increase in $T_B$.

In some embodiments the VMP function 160 forces the PMM function 141 to inhibit EV mode, provide an engine start request command to the EMP function 142 and the vehicle 100 is controlled to prevent the CIMG 123 from acting as a generator.

The VMP function 160 achieves this by providing a control signal to a driveline torque limit (DLT) module which in turn limits an amount of torque the CIMG 123 is permitted to develop. To prevent the CIMG 123 acting as a generator the DLT may receive a signal indicating that negative torque (developed when the CIMG 123 acts as a generator) is not to be developed, for example by reducing a 'permitted range' of torque that the CIMG 123 may develop, e.g. to positive values only. It is to be understood that in some embodiments the CIMG 123 may be prevented from being used to generate positive or negative torque by setting the permitted range to zero. Other arrangements are also useful In some embodiments, when the PMM function 141 determines that $T_B$ is below a prescribed value being a value below which battery performance may be degraded, the PMM function 141 may be arranged to inhibit operation of the vehicle 100 in EV mode thereby to reduce a risk that the amount of current demanded from the battery 150 causes damage to the battery 150 or an excessive reduction in the battery state of charge (SoC).

In some embodiments the PMM function 141 requests the EMP function 142 to control the vehicle 100 alternately to charge and discharge the battery 150, for example by means of the CIMG 123, when $T_B$ is below a prescribed value. This may have the effect of warming the battery 150.

Fault Condition

Furthermore, the PMM function 141 is arranged to receive a control signal from a vehicle mode process (VMP) function 149 indicative of the existence of one or more faults that may impact on vehicle performance.

In the event that the VMP function 149 informs the PMM function 141 of the existence of a fault, in some embodiments the PMM function 141 is responsive to the type of fault that has occurred.

For example, if the VMP function 149 informs the PMM function 141 that a fault exists rendering a battery 150 inoperable (such as a fault with the battery 150 or a circuit associated with the battery 150 such as an inverter circuit for supplying power to the CIMG 123), or that the CIMG 123 is faulty, the PMM function 141 may be arranged to cause the vehicle 100 to be controlled such that the driver demanded torque $TQ_d$ is provided substantially entirely by the engine 121, i.e. $TQ_e$ is set substantially equal to $TQ_d$. This may be accomplished in some embodiments by setting the permitted range of torque that the CIMG 123 may develop to substantially zero as described above. Other arrangements are also useful In some embodiments in the event that a fault is detected with the battery 150 or an associated system such that it is determined that charge should no longer be supplied to the battery 150 by the CIMG 123, the PMM function 141 may control the CIMG 123 to assume a shunt mode. In the shunt mode current generated by the CIMG 123 may be either dumped as heat to a resistive shunt load of the vehicle 100 or supplied to an electrical system of the vehicle 100 such as a 12V electrical system. The CIMG 123 may also be controlled to assume the shunt mode if a fault is found to exist with the CIMG 123.

If on the other hand the VMP function 149 informs the PMM function 141 that a fault exists rendering the engine 121 inoperable, the PMM function 141 may be arranged to shut down (and inhibit starting of) the engine 121 and to control the vehicle 100 such that $TQ_d$ is provided substantially entirely by the CIMG 123, i.e. $TQ_c$ is substantially equal to $TQ_d$.

In some alternative embodiments the PMM 141 may be arranged to control the vehicle according to a default mode when a fault condition exists. For example, the PMM 141 may be arranged to cause the vehicle 100 to be controlled such that $TQ_d$ is provided substantially entirely by the engine 121, i.e. $TQ_e$ is substantially equal to $TQ_d$ regardless of the fault condition. If the fault exists with the engine 121 the PMM function 141 may be arranged to render both the engine 121 and CIMG 123 inoperable.

Other arrangements are also useful.

It is to be understood that the functions described herein such as the PMM function 141, PCM function 145, EMP function 142 and so forth may be embodied in software code running on a microprocessor. The functions associated with the controller 140 (PMM function 141, EMP function 142, ESC function 143, TC function 144 and PCM function 145) may be embodied in software code running on the same computing device. Alternatively one or more of the functions may be embodied in software code running on one or more separate computing devices.

Similarly one or both of the VMP function 160 and TCM 131 may be embodied in software code running on the same computing device as the functions referred to above or on one or more separate computing devices. In the embodiment of FIG. 2 the VMP function 160 is embodied in software code running on a separate computing device associated with a separate electronic control unit (ECU) of the vehicle 100 to the above mentioned functions 141, 142, 143, 144, 145. Similarly the TCM 131 may be embodied in software code running on a computing device associated with the clutch 122 which is in turn associated with the transmission 124 as discussed above.

Aspects of control of the vehicle 100 by the controller 140 and in particular the PMM function 141 will now be discussed further.

The vehicle 100 has a 'ready' state and a not 'ready' state. If the vehicle 100 is in the not 'ready' state, the engine 121 is not permitted to run. The vehicle is not in a 'ready' state before the ignition has been switched on to crank the engine 121 (in a vehicle 100 having an ignition system) or a start button (or similar starting device) is operated to activate the vehicle.

Additionally, the vehicle 100 is not in a 'ready' state after the ignition has been switched off or the start button has been pressed in order to shut down the vehicle 100. In this state the clutch 122 is requested to remain open and the engine 121 is not requested to start.

The controller 140 prepares for the engine start by determining whether an immediate start is required.

When the vehicle 100 enters the 'ready' state by the user turning the ignition switch to an appropriate position or pressing the start button to activate the vehicle's driving mode (equivalent to the user cranking the engine in a conventional vehicle), if the engine 121 is not required to start immediately the vehicle 100 initialises into EV mode. In EV mode the engine 121 is not commanded to run and the clutch 122 remains disengaged. In this state the CIMG 123 is available to provide driving torque to the transmission 124 but the engine 121 is not available to provide torque to the transmission 124. It is to be understood that after some time in EV mode it may be required to start the engine 121.

If the engine 121 is required to start immediately, when the user activates the vehicle 100 as described above the controller 140 may command the engine 121 to be cranked.

Whether the vehicle initialises into EV mode and subsequently requests an engine start some time later, or the engine 121 is required to start immediately when the vehicle 121 enters the 'ready' state, the same engine start-up sequence may be followed.

When the controller 140 determines that the engine 121 is required to start, the controller 140 steps through the following sequence of states under the control of the PMM function 141:

1) a 'cranking' state, in which the engine 121 is cranked and accelerated to a speed greater than idle speed;
2) a 'housekeeping' state, in which the engine 121 completes its start-up, the ESC function 143 is active and vehicle systems are prepared to provide traction torque to two or more wheels 111, 112, 114, 115; and
3) an 'active' state, in which the engine 121 is available to provide traction torque to the two or more of the wheels 111, 112, 114, 115 and/or to drive the CIMG 123 to charge the battery.

It is to be understood that in the embodiment of FIG. 2 it is not possible to operate the vehicle 100 in a series mode in which the engine 121 charges the battery by providing torque to the CIMG 123 without simultaneously providing torque to two or more wheels 111, 112, 114, 115 via the transmission 124. This is because the CIMG 123 is directly connected to the transmission, i.e. no clutch is provided between the CIMG 123 and the transmission 124, and no further motor or motor/generator device is provided.

However in some embodiments where a further motor (or motor/generator) is provided and a clutch is provided between the CIMG 123 and transmission 124 it may be possible to drive the CIMG 123 as a generator to charge the battery 150 and simultaneously provide torque to two or more wheels 111, 112, 114, 115 by means of the further motor or motor/generator and not the engine 121.

Alternatively, a further generator device may be coupled directly to the engine 121 to generate power to recharge the battery 150. The vehicle may then be operated in the series mode by maintaining the clutch 122 in the open condition and providing torque to the transmission 124 by means of the CIMG 123.

Other arrangements are also useful, such as alternative locations of one or more of the motor/generator and clutches.

Thus it is to be understood that embodiments of the present invention are applicable to series hybrid operation as well as parallel hybrid operation.

Cranking Mode

The PMM function 141 is arranged to control the controller 140 to enter the cranking state when an engine start is requested by the EMP function 141. The PMM function 141 then provides a signal to the PCM function 145 to crank the engine 121.

When the engine 121 is being cranked the ESC function 143 is inactive in some embodiments. A base engine controller function (not shown in FIG. 2) associated with the engine 121 and arranged to control operation of the engine may be provided with modified control parameters (such as feedback control parameters) to improve starting performance during cranking. The base controller function may also be employed to accelerate the engine to an idle speed. In addition, the clutch 122 (and one or more further clutches) may be commanded to close.

It is to be understood that in some embodiments cranking may be performed by a slip-start method in which the clutch $K_0$ 122 is at least partially closed whilst the vehicle 100 is moving.

Housekeeping Mode

When the engine speed $W_e$ exceeds a threshold value the controller 140 begins certain 'housekeeping' operations in preparation for the active state. If it was not previously active, engine speed control is passed to the ESC function 143 by the PMM function 141. In the embodiment of FIG. 2 the ESC function 141 may also be referred to as a 'local engine speed control' function because it is implemented in software code running on the computing device of the controller 140.

The clutch 122 is also commanded to close if the transmission 124 is in a 'driving' mode (e.g. 'Drive', 'Sport' or 'Reverse' mode) or if $W_c$ exceeds a threshold value as described above.

The command to close the clutch 122 may be delayed if the TCM 131 reports that the clutch 122 is not in a state in which closure of the clutch 122 can be performed.

Active Mode

When the clutch 122 has been closed and the transmission 124 is operational the controller 140 enters the Active mode in which the engine 121 is either used to charge the battery 150 (in an idle charging mode of the vehicle) or used predominately to provide traction torque to the driven wheels (in the parallel mode), depending on the selected mode of the transmission 124.

The idle charging mode of the vehicle 100 may be assumed if the transmission 124 is in a 'Park' mode, a 'Neutral' mode or an undefined mode. In the idle charging mode, the engine 121 is used to charge the battery 150 and not to provide torque to any of the wheels 111, 112, 114, 115.

In this state the ESC function 143 is active and the PMM function 141 commands the clutch 122 to remain in the open condition.

Alternatively, the PCM function 145 may be active instead of the ESC function 143 to control the idle speed of the engine 121.

Parallel Mode

In the parallel mode, if the transmission is in the Drive, Sport or Reverse mode (or any other 'driving' mode) the engine 121 and CIMG 123 are employed to provide torque to the transmission 124, the CIMG 123 optionally being used to charge the battery 150 if required. The CIMG 123 may be controlled to provide substantially zero torque if required.

In this state the ESC function 143 is inactive and the PMM function 141 continues to command the clutch 122 to remain closed.

Series Mode

As noted above, in some embodiments of the invention a series mode of operation of the vehicle 100 is available. When operating in the series mode the PMM function 141 provides a control signal to the ESC function 143 to control the engine 121 to achieve and maintain a target engine speed $W_{eT}$ to power a generator (not shown in FIG. 1) coupled to the engine. In this state the ESC function 143 is active and the clutch 122 is commanded to be open. The CIMG 123 may then be employed to provide torque to the transmission 124.

When operating in series mode, the value of $W_{eT}$ may be selected to correspond to a speed at which the amount of electrical energy generated by the generator is optimised in respect of the amount of fuel consumed by the engine or the amount of exhaust gas generated (such as carbon dioxide). Other arrangements are also useful.

It is to be understood that the controller 140 is arranged freely to transition between the Housekeeping, Parallel and Idle Charging states according to the selected mode of operation of the transmission 124 and the state $S_{K0}$ of the clutch 122.

In some embodiments such as some embodiments in which the engine 121 is a gasoline engine, when the engine 121 is started the clutch $K_O$ 122 is kept open and the engine is maintained at an idle speed until the engine 121 has warmed to a suitable operating temperature.

It is to be understood that if the engine 121 is placed under a load before it reaches a suitable operating temperature an amount of undesirable gases emitted by the vehicle may be unacceptably high.

In some embodiments a speed $W_e$ of the engine 121 may be controlled to follow a speed of the CIMG $W_c$ whilst the engine 121 is warming. This is so that a driver's perception of the manner in which the engine 121 responds to throttle movement following engine start is consistent, thereby reducing a risk of driver distraction during the engine start and engine warm-up period, and the period following clutch closure.

This has the further advantage that a difference in speed of rotation of the input and output shafts 122IN, 122OUT of the clutch 122 is reduced thereby reducing a risk that an unacceptable difference in rotation rate between the shafts 122IN, 122OUT will be developed. Furthermore, if during engine warmup the amount of torque demanded by the driver exceeds that which the CIMG 123 may provide alone the clutch 122 may be closed and the engine 121 controlled to supplement the torque provided by the CIMG 123.

In some embodiments $W_e$ is controlled to track $W_c$ with a positive (or negative) speed offset. Providing a positive speed offset (in which $W_e$ is controlled to be greater than $W_c$) has the advantage that when it is decided to close the clutch 122, at the time the clutch 122 is completely closed and $W_e = W_c$, the amount of torque developed by the engine 121 may be greater than that if $W_e = W_c$ throughout the period of clutch closure. This has the advantage that the amount of torque provided by the engine may be closer to that required by the EMP 142 according to the calculated torque split.

Shut-Down Sequence

When the engine 121 is running and it is required to shut down the engine 121 (e.g. due to a transition from parallel to EV mode or when the driver has parked the vehicle 100) the PMM function 141 is arranged to coordinate an engine shut-down sequence which is arranged to stop the engine 121 in an optimal manner. The shut-down sequence also resets a state of certain other components of the vehicle 100.

When the PMM function 141 determines that the engine 121 should be shut down, a signal $S_e=0$ is provided to the PCM function 145 by the PMM function 141. The PCM function 145 is arranged to enter a ramp down/pre shutdown mode in which $W_e$ is ramped down to an idle speed and the amount of torque demanded of the engine $TQ_e$ is ramped towards zero. In this mode the ESC function 143 is not active and a signal $S_{K0}=0$ is provided to the TCM 131. The clutch 122 is therefore opened (or maintained in the open condition if it is already open).

When $W_e$ and $TQ_e$ have reduced sufficiently, the PMM function 141 starts a timer.

When the TCM 131 reports that the clutch is actually open, i.e. a control signal $S'_{K0}=0$ is received by the PMM function 141 and the timer has timed out (i.e. a prescribed time period has elapsed) the PMM control function 141 enters a Shutdown mode. In the Shutdown mode the ESC function 143 continues to be not active and the PMM function 141 continues to command the clutch 122 to remain open.

In addition, a command is issued to the PCM function 145 to actually stop the engine 121. Once the engine Stop command has been issued, if the engine 121 is being stopped due to an 'internal' request (i.e. not due to a driver command to stop the engine 121) the PMM function 141 may control the vehicle to assume the EV mode once the PCM function 145 reports that the engine has stopped running (i.e. the PMM function 141 determines that the control signal $S'_e=0$).

Alternatively, if the vehicle 100 has been deactivated by the user the PMM function 141 re-enters an initialisation state.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a parallel-type hybrid electric vehicle comprising:
    an energy management portion (EMP) configured to determine a required torque split between each of a first actuator and a second actuator in dependence on a value of a first set of one or more vehicle parameters, wherein the first actuator comprises an engine and the second actuator comprises an electric machine, and wherein the first and second actuators are each operable to deliver torque to a driveline of the vehicle,
    the controller being configured to provide an actuator request control output whereby each actuator is controlled to provide an amount of torque according to the required torque split,
    the controller further comprising a powertrain mode manager (PMM) portion, and
    the PMM portion being arranged to override a control output of the EMP thereby to cause the first actuator to rotate when disconnected from the driveline of the vehicle in dependence on a value of a second set of one or more vehicle parameters, wherein, in a first control mode, the controller controls the first actuator and the second actuator to drive the vehicle, wherein the controller controls a speed of rotation of the first actuator to substantially match a speed of rotation of the second actuator prior to connecting the first actuator to the driveline, and wherein, in a second control mode, the controller is configured to control a speed of rotation of the first actuator to vary with a speed of the vehicle when the first actuator is running and disconnected from the driveline of the vehicle such that a sound generated by the first actuator varies according to vehicle speed and creates a perception that the first actuator is connected to the driveline and driving the vehicle.

2. The controller as claimed in claim 1, wherein the PMM portion is arranged to override the required torque split output of the EMP responsive to the value of the second set of one or more vehicle parameters thereby to maintain the value of the second set of one or more vehicle parameters within a prescribed range.

3. The controller as claimed in claim 1, wherein the PMM portion is arranged to override the required torque split output of the EMP responsive to a control signal from a vehicle cabin temperature controller, the PMM portion being arranged to provide a control signal to start the first actuator thereby to generate heat to heat a cabin.

4. The controller as claimed in claim 1, wherein the PMM portion is responsive to a temperature of an aftertreatment apparatus arranged to process exhaust gas generated by the first actuator, wherein the PMM portion is arranged to maintain the temperature of the aftertreatment apparatus above a prescribed first aftertreatment apparatus temperature threshold by controlling the first actuator to start when the aftertreatment apparatus temperature falls below the prescribed first aftertreatment apparatus temperature threshold and the first actuator is stopped.

5. The controller as claimed in claim 4, wherein the PMM portion is arranged to maintain the temperature of the aftertreatment apparatus above the prescribed first aftertreatment apparatus temperature threshold by overriding a command by the EMP to shut down the first actuator when the temperature of the aftertreatment apparatus is below a second prescribed aftertreatment apparatus temperature threshold, wherein the first aftertreatment apparatus temperature threshold is lower than the second aftertreatment apparatus temperature threshold.

6. The controller as claimed in claim 1, wherein the PMM portion is arranged to maintain a coolant temperature above a prescribed first coolant temperature threshold by controlling the first actuator to start when the coolant temperature falls below the prescribed first coolant temperature threshold and inhibiting stopping of the first actuator by the EMP portion when the coolant temperature is below a second prescribed coolant temperature threshold.

7. The controller as claimed in claim 1, wherein the PMM portion is responsive to a temperature of a power storage device operable to provide power to the second actuator, wherein when the temperature of the power storage device is below a prescribed value the PMM portion is arranged to command at least one of: charging of the power storage device; drawing of charge from the power storage device; and alternately to charge the power storage device and draw charge from the power storage device thereby to warm the power storage device.

8. The controller as claimed in claim 1:
wherein the PMM portion is arranged to override the control output of the EMP responsive to a speed difference between a torque input portion and a torque output portion of a releasable torque transmitter that is arranged for coupling the first actuator to the driveline of the vehicle when the speed difference exceeds a prescribed value;
the controller being arranged to control rotation of the first actuator to reduce the speed difference to a value below the prescribed value.

9. The controller as claimed in claim 1, wherein, when the first actuator is not operating, the PMM portion is arranged to start the first actuator thereby to power a brake pump when a state of a brake system status flag indicates a brake pressure is below a prescribed threshold.

10. The controller as claimed in claim 9, wherein:
the controller is configured to monitor, when the first actuator is not operating, actuation of brakes of the vehicle,
the controller being operable to command starting of the first actuator responsive to at least one selected from amongst a number of times a brake pedal is depressed, a number of times pressure is applied to the brake pedal above a prescribed value, and a function responsive to an integral of the brake pressure applied as a function of time.

11. The controller as claimed in claim 1:
wherein the EMP is operable to provide a control output to command starting and stopping of the first actuator, the PMM portion being operable to override a command from the controller to start or stop the first actuator.

12. The controller as claimed in claim 1, wherein the PMM portion is operable to override the control output of the EMP thereby to command an alternative torque split between the first and second actuators.

13. The controller as claimed in claim 8, wherein the releasable torque transmitter is a clutch.

14. The controller as claimed in claim 8, wherein the controller is operable to control the releasable torque transmitter to selectively connect the first actuator to the driveline of the vehicle when the speed difference exceeds the prescribed value.

15. A method of controlling a hybrid electric vehicle, the method comprising:
determining a required torque split between each of a first actuator and a second actuator in dependence on a first set of one or more vehicle parameters, the required torque split being an amount of torque required to be provided to a driveline of the vehicle by each actuator, wherein the first actuator comprises an engine and the second actuator comprises an electric machine, and
providing an actuator request control output to control each actuator to provide an amount of torque according to the required torque split,
the method further comprising overriding a required torque split output in dependence on a value of a second set of one or more vehicle parameters, and, in a first mode, controlling a speed of rotation of the first actuator to substantially match a speed of rotation of the second actuator prior to connecting the first actuator to the driveline, and, in a second mode, controlling a speed of rotation of the first actuator to vary with a speed of the vehicle when the first actuator is running and disconnected from the driveline of the vehicle such that a sound generated by the first actuator varies according to vehicle speed and creates a perception that the first actuator is connected to the driveline and driving the vehicle.

16. A controller for controlling a parallel-type hybrid electric vehicle, the controller being operable to control an engine and an electric machine to deliver motive torque to a driveline of the vehicle, wherein, in a first control mode, the controller controls the engine and the electric machine to drive the vehicle, wherein the controller controls a speed of rotation of the engine to substantially match a speed of rotation of the electric machine prior to connecting the engine to the driveline, and wherein, in a second control mode, the controller controls the electric machine to drive the vehicle and controls the engine to be disconnected from the driveline of the vehicle, the controller being operable, when in the second control mode, to control a speed of rotation of the engine to vary with a speed of the vehicle when the engine is running and disconnected from the driveline of the vehicle such that a sound generated by the engine varies according to the vehicle speed and creates a perception that the engine is connected to the driveline and driving the vehicle.

* * * * *